(12) United States Patent
Moore et al.

(10) Patent No.: US 12,515,866 B2
(45) Date of Patent: *Jan. 6, 2026

(54) PACKAGING MATERIAL

(71) Applicant: tForm, Inc., Greenville, SC (US)

(72) Inventors: Benjamin Edward Lee Moore, Central, SC (US); Wesley Robert Johnson, Greenville, SC (US)

(73) Assignee: tForm, Inc., Greenville, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/636,656

(22) Filed: Apr. 16, 2024

(65) Prior Publication Data

US 2024/0262596 A1 Aug. 8, 2024

Related U.S. Application Data

(63) Continuation of application No. 17/012,870, filed on Sep. 4, 2020, now Pat. No. 11,981,492.

(Continued)

(51) Int. Cl.
*B65D 81/03* (2006.01)
*B32B 3/20* (2006.01)
(Continued)

(52) U.S. Cl.
CPC ............ *B65D 81/03* (2013.01); *B32B 3/20* (2013.01); *B32B 3/30* (2013.01); *B32B 29/005* (2013.01);
(Continued)

(58) Field of Classification Search
CPC ........ B65D 81/03; B65D 65/466; B32B 3/20; B32B 3/30; B32B 29/005; B32B 2307/54; B32B 2317/12; B32B 2250/26
See application file for complete search history.

(56) References Cited

U.S. PATENT DOCUMENTS 7,255,910 B1    8/2007  Seckel
11,981,492 B2*  5/2024  Moore ................... B31F 5/04
(Continued)

FOREIGN PATENT DOCUMENTS

EP    2463088 A2      6/2012
GB    2093403 A       9/1982
WO    2018185213 A1  10/2018

OTHER PUBLICATIONS

United States Patent & Trademark Office (USPTO), International Search Report and Written Opinion dated Dec. 10, 2020 cited in PCT/US2020/049467.

*Primary Examiner* — Catherine A. Simone
(74) *Attorney, Agent, or Firm* — von Briesen & Roper, s.c.

(57) ABSTRACT

The disclosed embodiments relate to an insulative protective packaging material constructed using recyclable paper materials. The packaging material includes one or more plies of paper adhered to each other. The one or more plies can have protrusions that form gas pockets. The gas pockets can be sealed by another ply to provide shock absorbency and insulation. Further, the plies can be used in multiple ways such as by nesting the protrusions of one ply into the recessed of another ply, layering multiple plies on top of each other, or individually. Each ply can be substantially flat or have protrusions. The protrusions can be made in various ways such as alternating the directions that they extend and varying the shapes of the protrusions. The resulting packaging material can be used as a shipping container or as liners within shipping containers.

17 Claims, 16 Drawing Sheets

Related U.S. Application Data

(60) Provisional application No. 62/895,531, filed on Sep. 4, 2019.

(51) Int. Cl.
    *B32B 3/30*     (2006.01)
    *B32B 29/00*     (2006.01)
    *B65D 65/46*     (2006.01)

(52) U.S. Cl.
    CPC ........ *B65D 65/466* (2013.01); *B32B 2250/26* (2013.01); *B32B 2307/54* (2013.01); *B32B 2317/12* (2013.01)

(56) References Cited

U.S. PATENT DOCUMENTS

| | | |
|---|---|---|
| 2001/0031339 A1 | 10/2001 | Johnson |
| 2003/0021649 A1 | 1/2003 | Shetty |
| 2004/0076798 A1 | 4/2004 | Larsson et al. |
| 2010/0028611 A1 | 2/2010 | Adie |
| 2011/0318522 A1 | 12/2011 | Mueller et al. |

* cited by examiner

500

600

700

800

900

1000

1002

1100

1200

1300

1400

1402    1404    1406    1408

1700

1702

1702

1704

1800

2000

| Property | Direction | Standard | Improved |
|---|---|---|---|
| Basis Weight [g/m^2] | - | ~100 | ~100 |
| Tensile Strength [kN/m] | Machine | 5.5 | ≥8 |
| | Cross | 3.2 | ≥6 |
| Elongation at Break [%] | Machine | 2.5 | ≥9 |
| | Cross | 4 | ≥9 |

Figure 20A

| Property | Example 1 Standard | Example 2 Improved |
|---|---|---|
| Protrusion Diameter [mm] | 10 | 10 |
| Protrusion Depth [mm] | 1 | 4 |
| Protrusion Volume [mm^3] | 79 | 314 |

Figure 20B

PACKAGING MATERIAL

CROSS-REFERENCE TO RELATED APPLICATION(S)

This application is a continuation of U.S. patent application Ser. No. 17/012,870 filed on Sep. 4, 2020, titled, "PACKAGING MATERIAL," which claims benefit of U.S. Provisional Patent Application No. 62/895,531 filed on Sep. 4, 2019, titled, "INSULATING RECYCLABLE PROTECTIVE PACKAGING MATERIAL," the aforementioned applications are incorporated herein by reference in their entirety.

TECHNICAL FIELD

The disclosed teachings relate to a packaging material. More specifically, the disclosed teachings relate to an insulative, recyclable, and shock-absorbent packaging material.

BACKGROUND

Demand for packaging materials has increased dramatically with the growing popularity of e-commerce websites that ship individually packaged items. In many cases, the items are fragile and need to be protected by packaging materials. For example, packaging materials such as BUBBLE WRAP® often provide cushioning for fragile or sensitive items. Other protective packaging materials are generally available in different sizes, with different levels of cushioning, and with different bubble sizes.

Additionally, e-commerce companies have begun to ship temperature-sensitive items such as fresh groceries and frozen items directly to customers. This has increased the demand for packaging materials that provide thermal protection during transport. The two primary characteristics of an insulative material are the thermal conductivity and thickness. The type of insulative material used in packaging can vary based on the sensitivity of the product to temperatures, regulatory requirements, and the combination of materials being used.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

FIGS. 20A and 20B are tables illustrating the properties of standard and improved paper.

DETAILED DESCRIPTION

Figure 1:
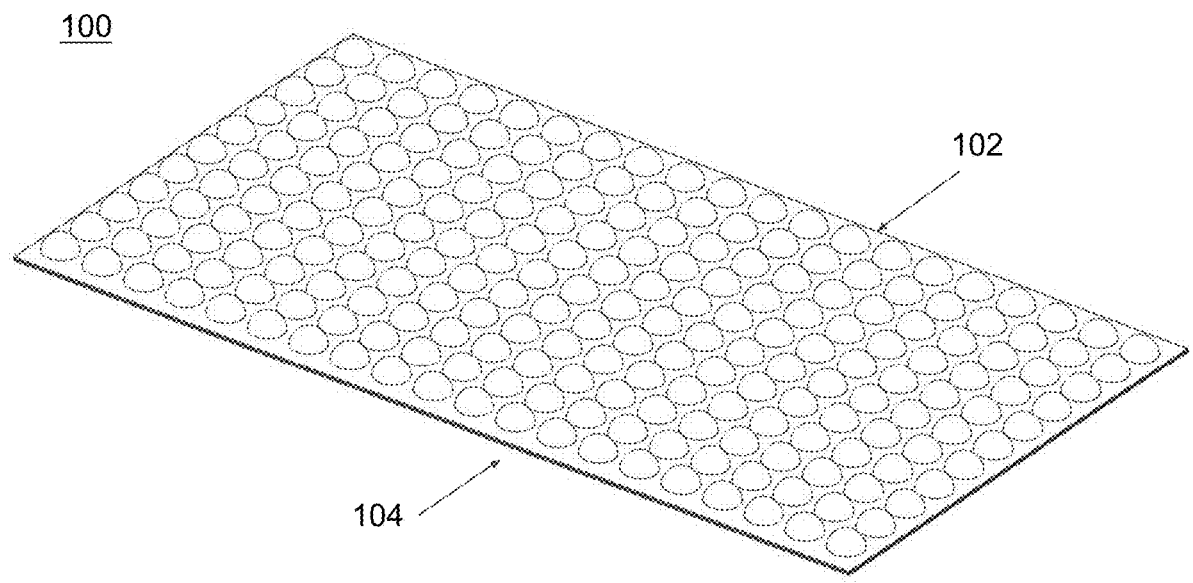
FIG. 1 is an isometric view of a two-ply packaging material.

Packaging is the science, art, and technology of enclosing and/or protecting products for distribution, storage, sale, and/or use. Packaging can also be described as a coordinated system of preparing goods for transport, warehousing, logistics, sale, and/or end use. The objectives of packaging are generally known: physical protection (e.g., from mechanical shock, vibration, and the environment), containment, marketing, security, convenience, and portion control.

To achieve the objectives of packaging, several types of packaging can be used. Although packaging types can vary based on the product, transportation medium, and target receiver (e.g., consumer or manufacturer), packaging can be categorized into three categories. First, a primary packaging is the material that first envelops the products and holds them. Second, a secondary packaging is outside the primary packaging and may be used to prevent theft or to group packages together. Third, tertiary or transit packaging is used for bulk handling, warehouse storage, and transport shipping. There are exceptions to these broad categories, and they are not mutually exclusive. For example, shrink wrap can be primary packaging, secondary packaging, and tertiary packaging.

The development of packaging, like other materials, begins with an identification of the requirements. The requirements can range from structural design and marketing to legal and logistical concerns. However, one of the central considerations is environmental footprint. In particular, package development involves consideration of sustainability, environmental responsibility, and application to environmental and recycling regulations. In informal terms, the "three R's" apply to packaging development: reduce, reuse, and recycle. This includes considering waste prevention, minimization of source materials, reusability, recyclability, energy waste, and eco-friendly disposal.

Considerations such as these have become increasingly important because e-commerce has exponentially increased in the last decade. This increase has caused the need for packaging that meets the previously mentioned requirements and considerations to increase also. Moreover, there is a greater variance in the types of goods (e.g., non-perishable and perishable) that require packaging. Due to the increase and the emphasis on environmental considerations, common packaging such as BUBBLE WRAP® is no longer ideal.

Current packaging is deficient in multiple facets; however, there are two characteristics that need to be addressed immediately. First, packaging is heavily reliant on plastic, which increases the negative environmental footprint. Plastic use is particularly an issue with the increase in e-commerce accessibility in all corners of the world. While some people may have access to and actively recycle plastic material, others who participate in e-commerce do not. Thus, because of the inability of plastic to degrade naturally in a short time, the environmental impacts are severe. Second, packaging is often a combination of environmentally friendly and environmentally non-friendly materials. This makes it difficult for even an environmentally conscious person to disassemble the packaging in order to place the components in the correct recycling channels.

The embodiments introduced here overcome these drawbacks with packaging material ("material") that is recyclable, and that has industry standard thermal conductivity and shock-absorption characteristics. The embodiments enable packaging materials to be placed in paper recycling streams with no disassembly or intervention from the consumer. The packaging material disclosed herein can be used to create various containers to store payloads such as pouches, envelopes, and bags. Additionally, the packaging material can be used without transformation such as adding a covering or liner. Due to the material's thermal conductivity and mechanical-shock absorption capabilities, the material can be used to transport and store various products moving within the e-commerce industry.

In some embodiments, the material is made of multiple plies of paper. One or more of the plies can include multiple protrusions. The protrusions protrude out of the plane formed by a ply of the paper (the "horizontal plane"). A second paper ply can be adhered to the ply with protrusions such that the second ply covers and seals the recesses caused by the protrusions. The adhering mechanism can be any of a chemical and/or mechanical fastening method. After multiple plies are adhered together, the result can be a multiple-ply material containing numerous sealed protrusions. The sealed protrusions may be any shape or size which can be formed into the paper and create volume, such as a sphere, rectangle, or cylinder. The sealed protrusions, because they contain gas, create a barrier to the transfer of thermal energy to the item being packaged.

In some embodiments, the sealed protrusions dissipate mechanical energy. Mechanical energy is dissipated when the protrusions are deformed due to an external force cause by, for example, a drop or other impact. For instance, when an external force is exerted on the protrusions, the protrusions contract to absorb the mechanical energy, rather than directly transferring it to the packaged item. As such, multiple plies including protrusions can provide more protection from mechanical shock. For example, in a two-ply material, both plies can have protrusions. The protrusions can extend in opposite directions such that the two plies can be adhered together with the protrusions aligning to form double the volume.

In some embodiments, the geometry of the protrusions and number of plies can vary. For example, a single ply can have protrusions that protrude in opposite directions and/or protrusions of different shapes and sizes. Further, multiple plies of paper can be added to the materials. The multiple plies can include plies with protrusions and plies without. For example, in a three-ply packaging material, two plies can include protrusions that extend in opposite directions and a third ply without protrusions that is inserted between the other two plies.

In some embodiments, the material is made of a special class of paper (called "improved paper" herein) that has elastic properties that allows the paper to be stretched without rupturing during the protrusion forming process. Generally, paper has an isotropic modulus of elasticities that differ based on the direction of the external force. For example, the modulus of elasticity of paper in the machine direction is significantly differently than the modulus of elasticity in the cross direction. Machine direction is the direction that is parallel to the direction of the movement of the forming wire on a papermaking machine. The direction perpendicular to the machine direction is the cross direction. Improved paper has isotropic properties in both directions, allowing for the geometry to be more easily shaped into protrusions.

In some embodiments, the material is made of only recyclable material such that a user can recycle the material without disassembling or removing any components. For example, the material can be made of only improved paper. In another example, the material can be made of cardboard. In some embodiments, the material can be made of a combination of recyclable materials such as improved paper and cardboard.

Turning to FIG. 1, FIG. 1 depicts an isometric view of a two-ply packaging material 100. Two-ply packaging material 100 includes formed ply 102 and unformed ply 104. A formed ply is one that has protrusions and an unformed ply is one that is substantially flat. Formed ply 102 can include protrusions and flat portions. The protrusions can correspond to recessed portions on the other side of the formed ply 102. For example, in FIG. 1, the top surface of formed ply 102 is depicted with protrusions. The protrusions are dome or circular shaped and a corresponding dome or circular recess will be present on the bottom surface of formed ply 102.

The protrusions can be arranged in a variety of patterns. For example, FIG. 1 depicts the protrusions in a grid pattern with protrusions extending in both the length and width directions. In some embodiments, the protrusions can be further separated, follow a pattern (e.g., spiral), and/or in contact with each other. For example, the protrusions can be formed immediately next to each other such that the walls of the protrusions are in contact. In another example, the protrusions can be separated by a distance equivalent to the diameter of one of the protrusions.

In some embodiments, the size (e.g., in diameters) of the protrusions can differ. For example, two-ply packaging material 100 can have a width of 12 inches and each protrusion can have a diameter of 1 inch. In some embodiments, the size of the protrusions can be dependent on the size of the two-ply packaging material 100. For example, there can be a one to ten proportional relationship between the diameter of the protrusion and the width of two-ply packaging material 100.

The unformed ply 104 can be substantially flat and can adhere to the bottom side of the formed ply 102. For example, the unformed ply 104 can adhere to the flat portions, in between the recessed portions, on the bottom of the formed ply 102. By adhering the plies, 102 and 104, together, the protrusions can be sealed and form pockets of gas. In some embodiments, the two plies, 102 and 104, can be adhered together using an adhesive material (e.g., glue).

Figure 2:
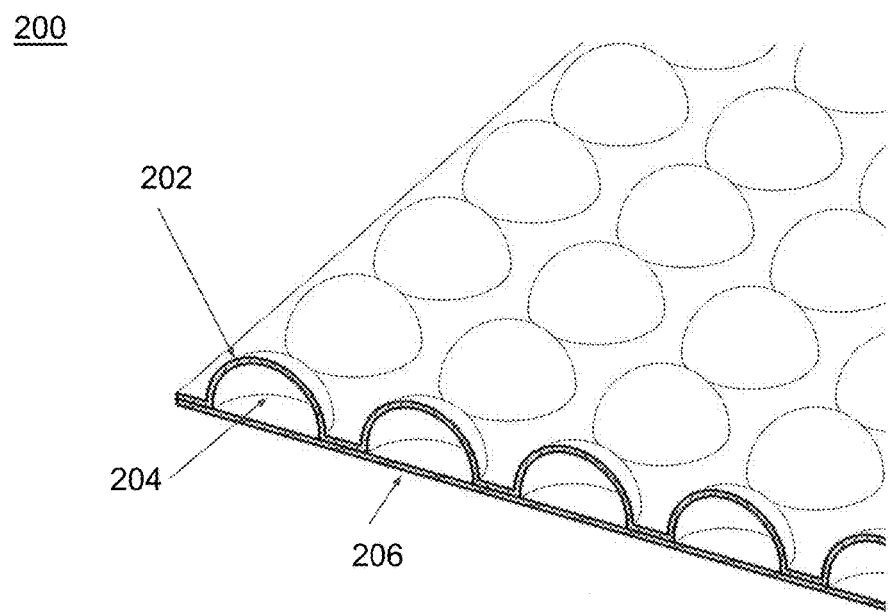
FIG. 2 is a sectional view of a two-ply packaging material.

FIG. 2 is a sectional view of a two-ply packaging material 200. Two-ply packaging material 200 includes protrusion 202, gas pocket 204, and unformed ply 206. Protrusion 202 is formed within a formed ply, which is adhered to unformed ply 206. By adhering the two plies together, gas pocket 204 is formed. Gas pocket 204 can provide a resistance to mechanical force and thermal insulation.

For example, gas pocket 204 can vary in pressure such that the protrusion 202 can bend, rather than burst, when mechanical force is exerted. For instance, the gas pocket 204 can be at 75% capacity, allowing for compression and absorption when a force is exerted. Similarly, the gas pocket 204 can provide thermal insulation by, for example, increasing the distance between the environment and the product. For instance, two-ply packaging material 200 can be used to package a box of medicine that is temperature sensitive. When there is a temperature difference between the environment and the temperature inside the medicine box, the rate of exchange in thermal energy will be decreased due the separation caused by unformed ply 206 and gas pocket 204.

Figure 3A:
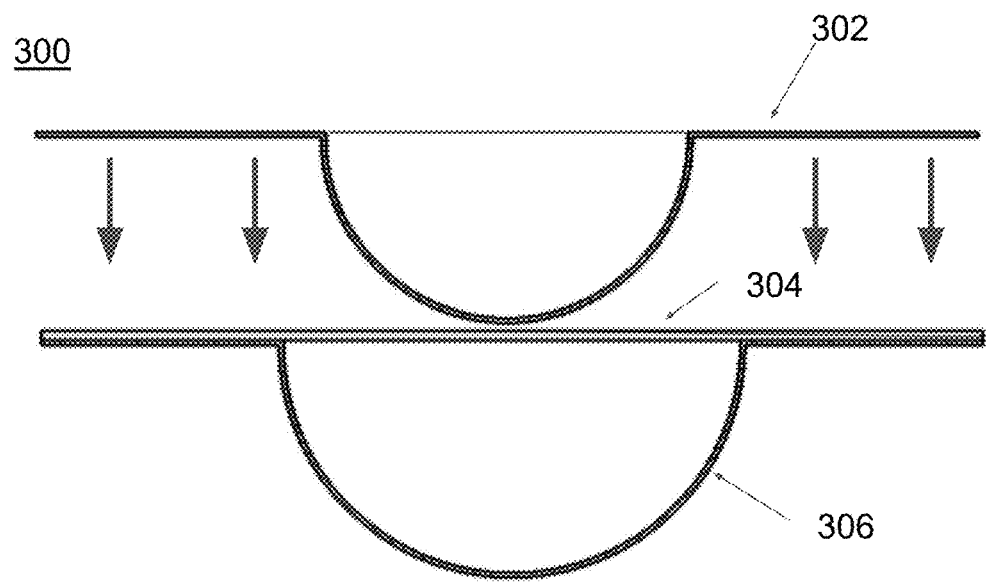
FIGS. 3A, 3B, and 3C depict a flow of an embodiment of the forming process.
Figure 3B:
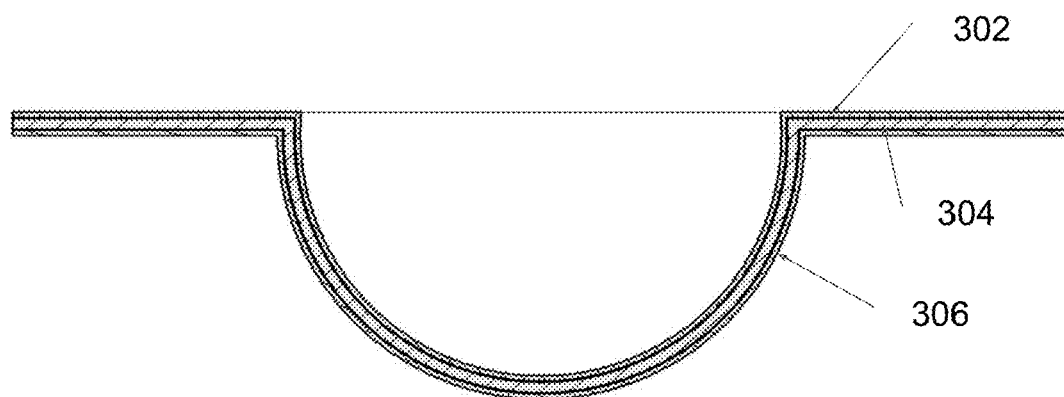
Figure 3C:
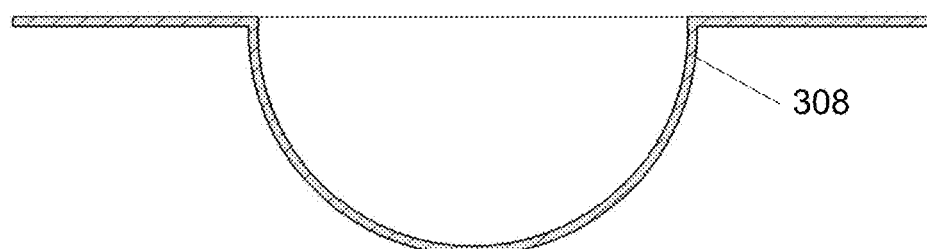

FIGS. 3A, 3B, and 3C depict a flow of an embodiment of the forming process 300. The forming process 300 can be performed using a forming tool which include male component 302 and female component 306. Forming process 300 further includes unformed ply 304 and formed ply 308. The forming process 300, as illustrated by the downward pointing arrows in FIG. 3A, includes exerting force on the male component 302 such that the male component 302 extends unformed ply 304 into female component 306. Once the force has been exerted, as depicted in FIG. 3B, the unformed ply 304 is stretched to fit the shape of the components, 302 and 306. In some embodiments, the unformed ply 304 is held in place against female component 306. This can help ensure that the unformed ply 304 stretches into female component 306. Once stretched, the unformed ply 304 becomes formed ply 308, as depicted in FIG. 3C.

Figure 4A:
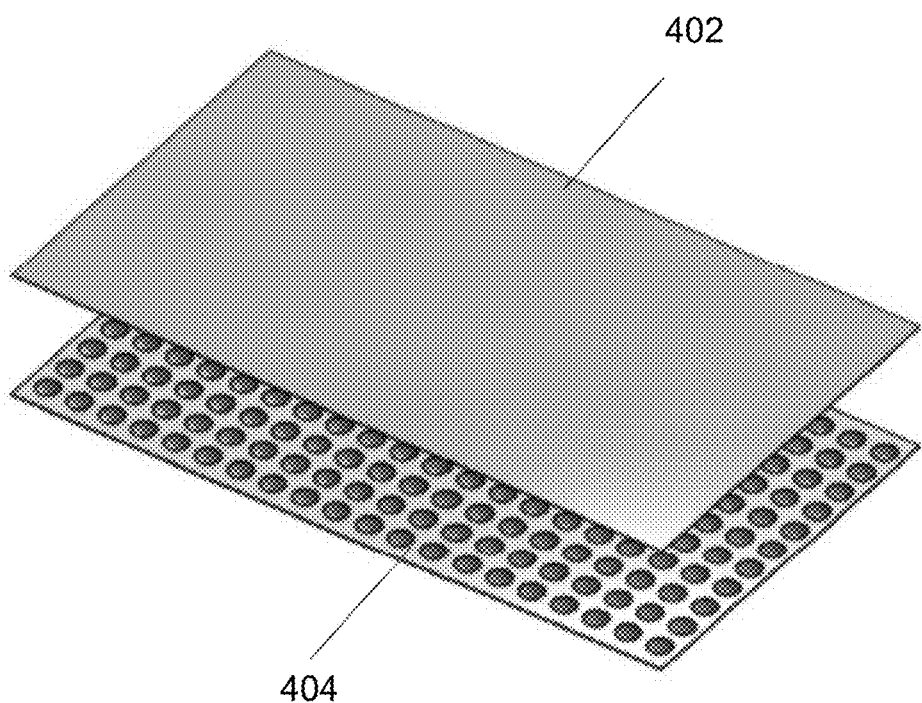
FIGS. 4A and 4B depict an embodiment of a two-ply packaging material.
Figure 4B:
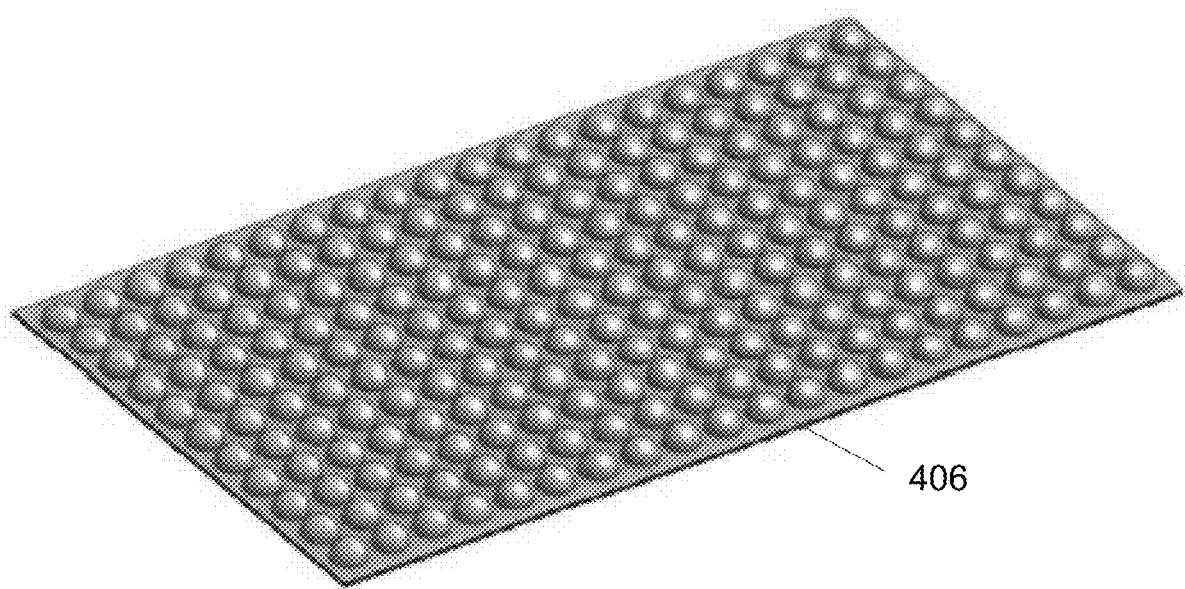

FIGS. 4A and 4B depict an embodiment of a two-ply packaging material forming process 400. The process 400 includes unformed ply 402, formed ply 404, and two-ply packaging material 406. In some embodiments, two-ply packaging material 406 can be formed by pressing and adhering an unformed ply 402 onto a formed ply 404. For example, unformed ply 402 can be adhered to the side of formed ply 404 with the protrusions. By doing so, the unformed ply 402 can stretch to form the protrusions.

In some embodiments, the male and female component described in conjunction with FIGS. 3A, 3B, and 3C can be used to form unformed ply 402. For example, unformed ply 402 can be glued to formed ply 404. After being glued, the male and female components can be used to form the protrusions in unformed ply 402 and to ensure that the plies 402 and 404 are adhered together. The result of adhering plies 402 and 404 together can be two-ply packaging material 406.

Figure 5:
FIG. 5 is a side view of a three-ply packaging material.
Figure 6:
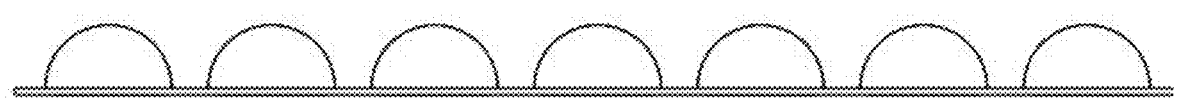
FIG. 6 is a side view of a two-ply packaging material.

FIG. 5 is a side view of a multiple-ply packaging material 500. In some embodiments, the material can include multiple-plies. The multiple-plies can be applied to a formed ply on the side include the protrusions or the side including the recesses. FIG. 5, for example, depicts a multiple-ply packaging material 500 with the unformed plies being applied to the side of the formed ply having the recesses. Alternatively, FIG. 6 is a side view of a two-ply packaging material 600. Two-ply packaging material 600 includes one formed ply and one unformed ply adhered together.

Figure 7:
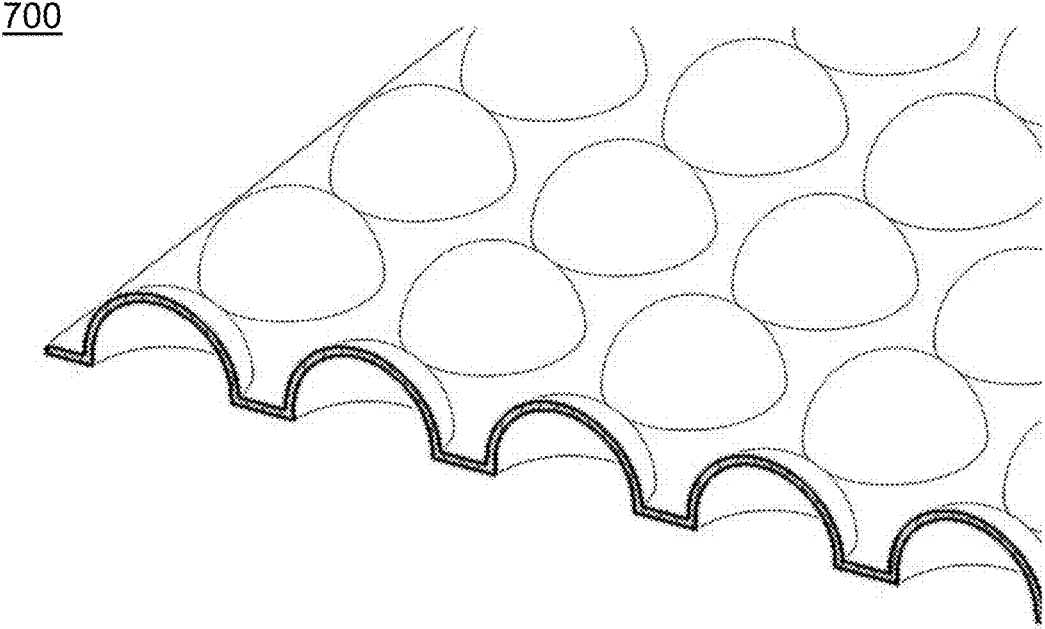
FIG. 7 is a sectional view of a single-ply material.

In some embodiments, a single formed ply can be used. For example, FIG. 7 is a sectional view of a single-ply material 700. The single-ply material 700 includes protrusions that are not sealed; thus, the recesses are exposed to the environment. This can be beneficial to lower costs and/or in situations when additional protective packaging material is already being used.

Figure 8:
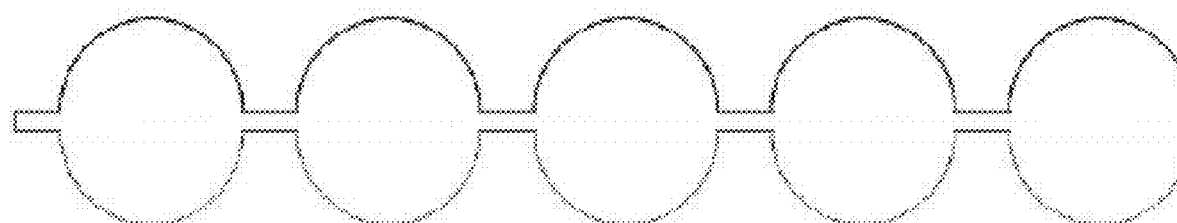
FIG. 8 is an isometric view of a two-ply and double-formed packaging material.

FIG. 8 is an isometric view of a two-ply and double-formed packaging material 800. In some embodiment, a multiple-ply packaging material can include multiple formed plies adhered to each other. For example, the two-ply and double-formed packaging material 800 includes two formed plies adhered to each other such that the protrusions align. By doing so, the pockets of gas are expanded, and thus, can provide more thermal and mechanical-shock protection to a product.

Figure 9:
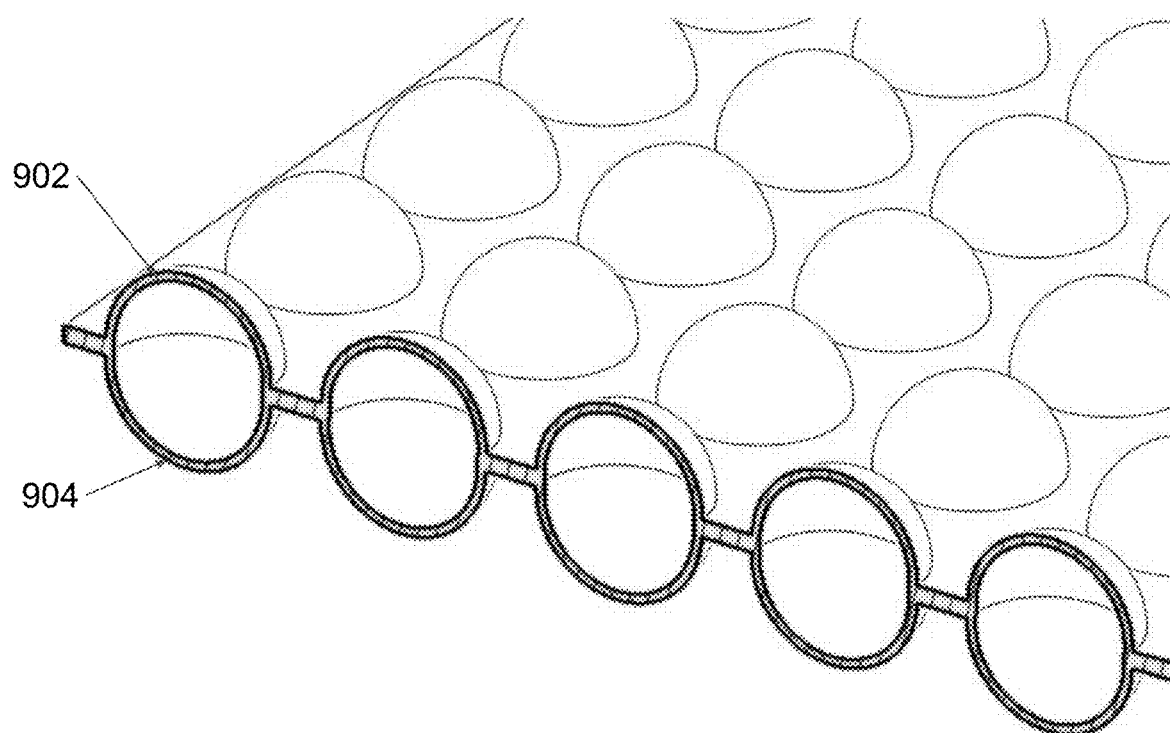
FIG. 9 is a sectional view of a two-ply and double-formed packaging material.

Similarly, FIG. 9 is a sectional view 900 of a two-ply and double-formed packaging material. Sectional view 900 includes a top formed ply 902 and bottom formed ply 904. Similar to the two-ply and double-formed packaging material 800, the packaging material in section view 900 includes gas pockets that may provide more protection than a single-formed package material.

Figure 10A:
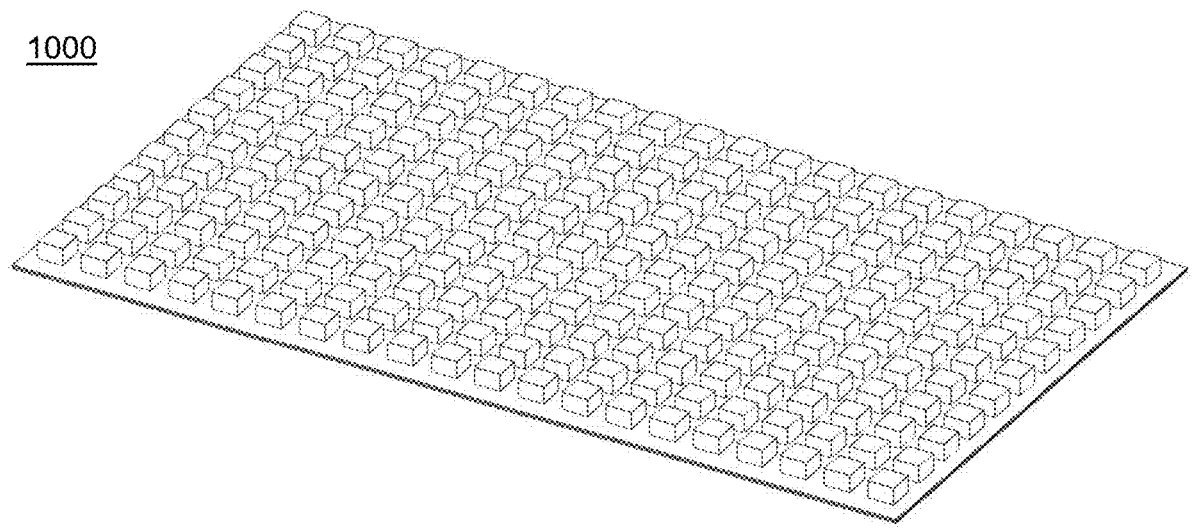
FIGS. 10A and 10B depict a two-ply and single-formed packaging material with an alternate geometry.
Figure 10B:
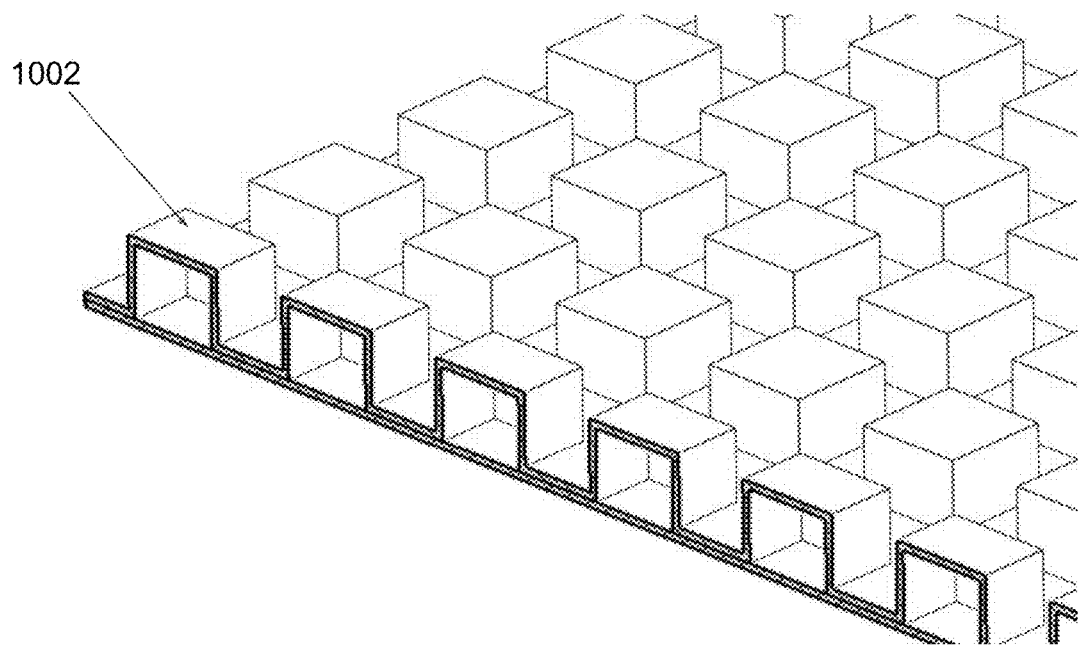

FIGS. 10A and 10B depict a two-ply and single-formed packaging material with an alternate geometry. In some embodiments, the geometry of the protrusions can be substantially rectangular, octagonal, or other geometric shape. For instance, FIG. 10B includes rectangularly shaped protrusion 1002. In some embodiments, the geometry of the protrusions can vary within the same ply. For example, one half of a ply can include circular protrusions, while the other half can include rectangular protrusions.

Figure 11A:
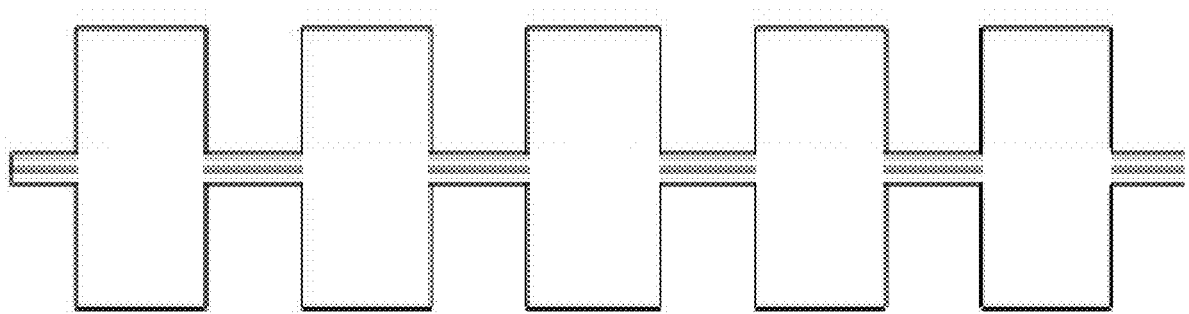
FIGS. 11A and 11B depict two-ply and double-formed packaging material with an alternate geometry.
Figure 11B:
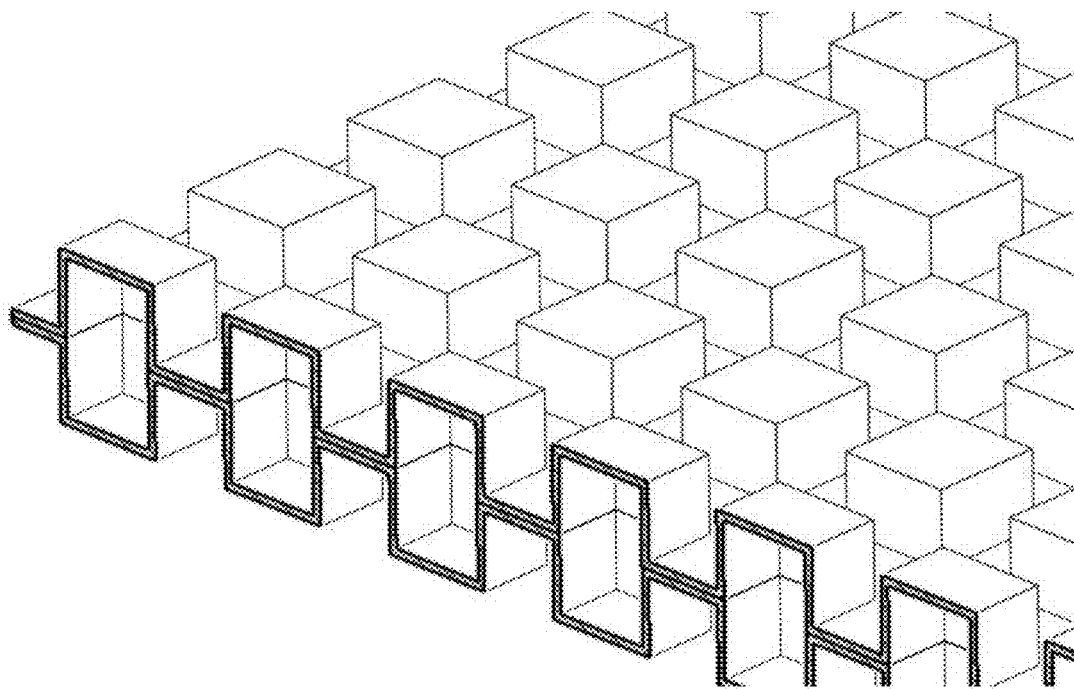

FIGS. 11A and 11B depict two-ply and double-formed packaging material with an alternate geometry. In some embodiments, multiple-plies can be adhered to each other such that the gas pockets are aligned, as mentioned above. FIGS. 11A and 11B depict rectangular protrusions that are aligned to form a rectangular gas pocket. As mentioned above, this design may increase the protective capabilities of the packaging material. In some embodiments, the degree to which the protrusions are aligned may vary. For example, the recesses of each ply can align with half of the recess of another ply. This can enable air flow between multiple gas pockets such that mechanical energy can be dissipated along a larger portion of the ply, rather than one gas pocket.

Figure 12A:
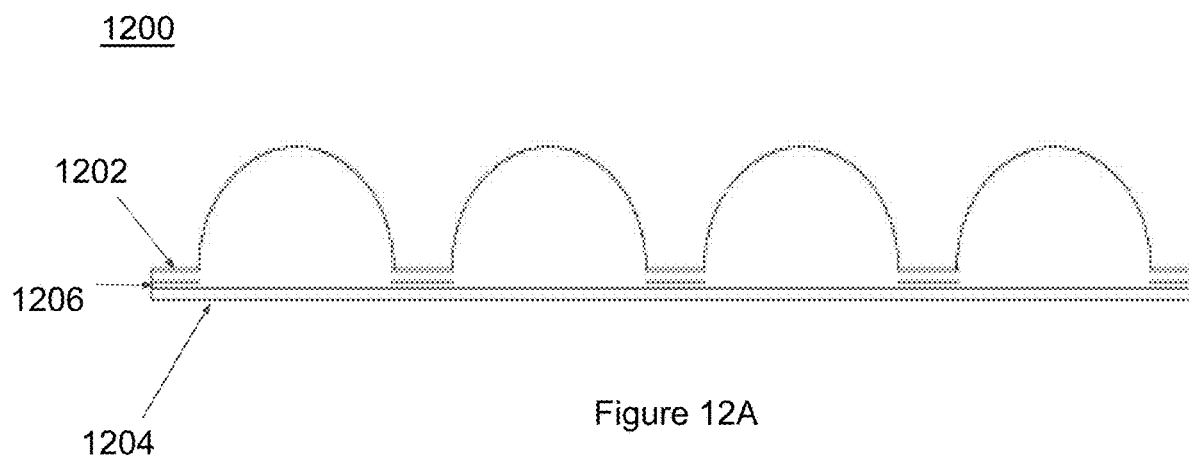
FIGS. 12A, 12B, and 12C depict two-ply and single-formed packaging material with an adhesive layer.
Figure 12B:
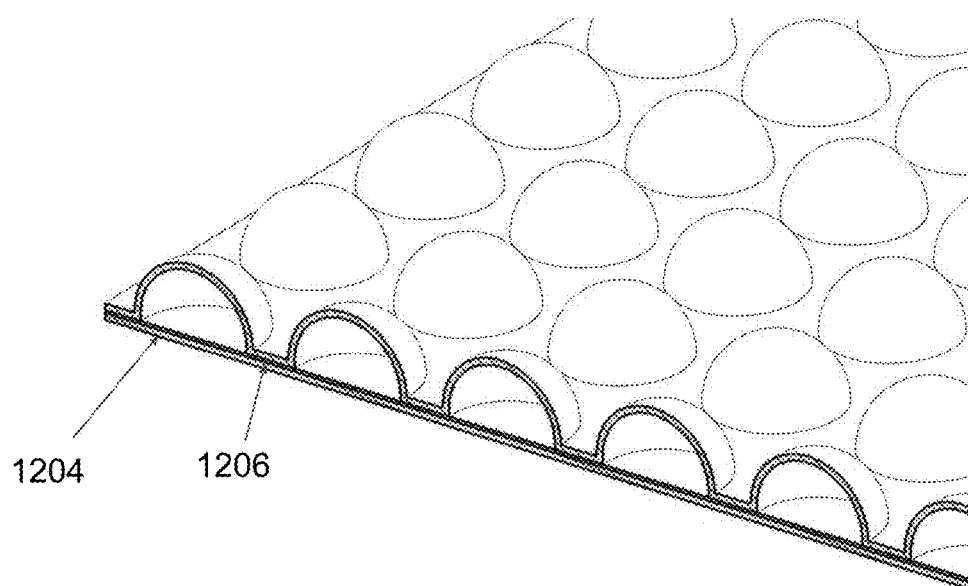
Figure 12C:
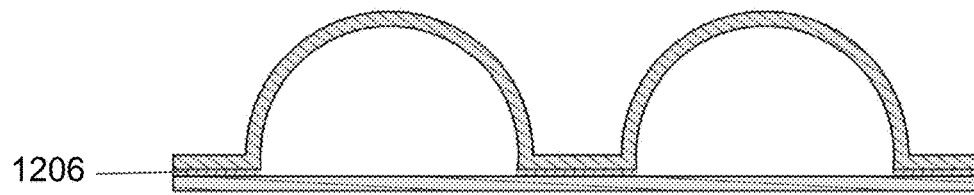

FIGS. 12A, 12B, and 12C depict multiple views 1200 of a two-ply and single-formed packaging material with an adhesive layer. In some embodiments, the multiple plies in a multiple-ply design are adhered to each other using an adhesive material. An adhesive material is any substance that is applied to one or both surfaces of two separate items that binds them together and resists separation. For example, multiple-plies can be adhered together using glue, hot glue, an adhesive resin, or other material with adhesive properties. FIGS. 12A, 12B, and 12C includes formed ply 1202, unformed ply 1204, and adhesive 1206. The adhesive 1206 is applied to the portions that contact each other (e.g., the flat portions between protrusions). The amount of adhesive and placement of the adhesive depends on the type and strength of the adhesive. In some embodiments, the adhesive can be applied to fraction of the portions that are in contact with each other. Alternatively, the adhesive can be applied to the entirety of the portions that are in contact with each other.

Figure 13A:
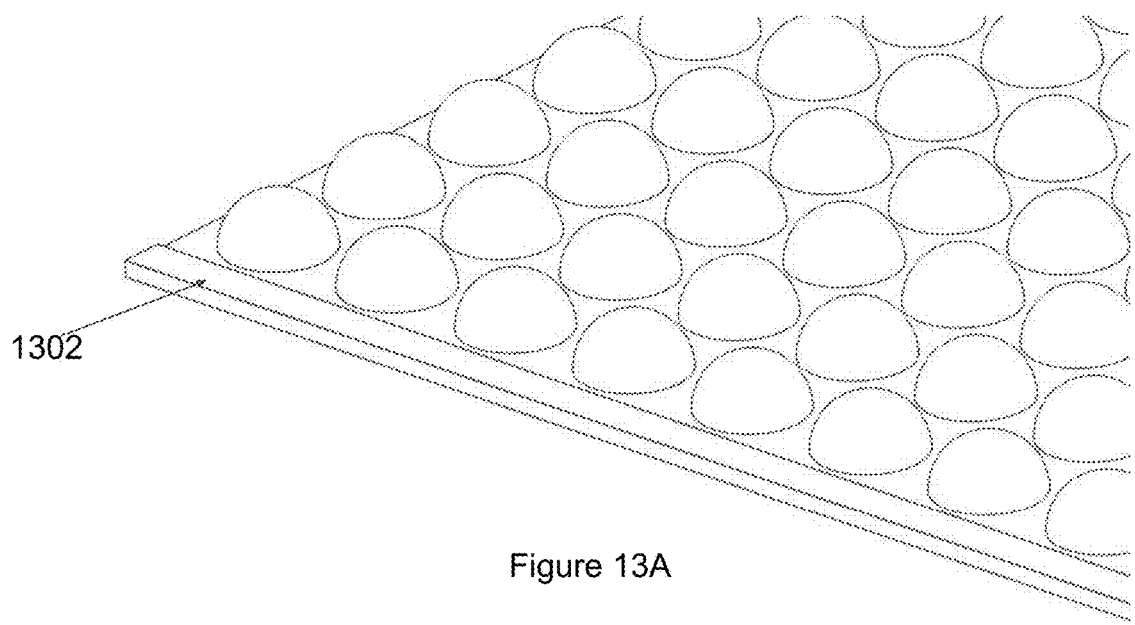
FIGS. 13A and 13B depict two-ply and single-formed packaging material with a folded edge.
Figure 13B:
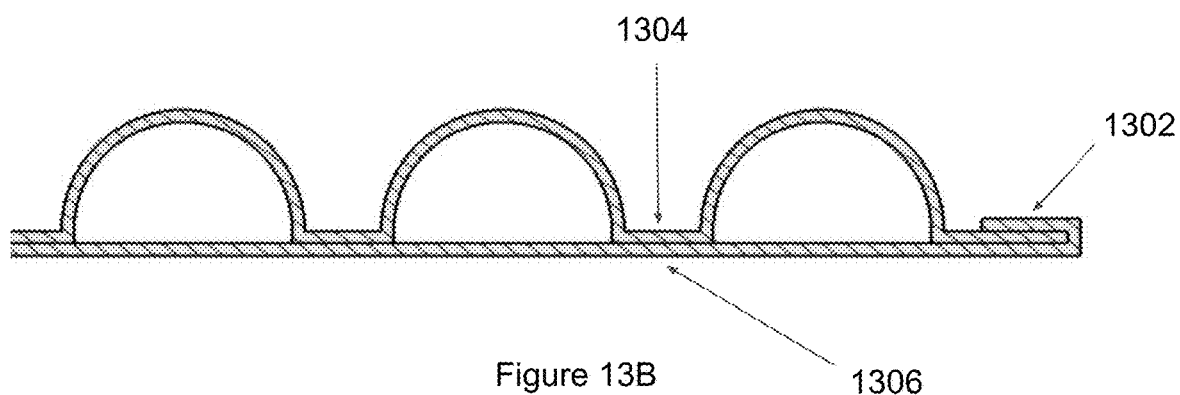

FIGS. 13A and 13B depict two-ply and single-formed packaging material with a folded edge. Multiple-plies can be adhered to each other using various methods such as adhesives, clamps, fasteners, and/or folding of edges. FIGS. 13A and 13B depict a folding method 1300 including folded edge 1302 to grip formed ply 1304 and unformed ply 1306 together. In some embodiments, one of the plies has a portion that is longer in a one direction than the other ply. The portion that stretches beyond the other ply can be folded on to the smaller ply. For example, in FIG. 13B, the unformed ply 1306 has a longer edge that becomes the folded edge 1302. In some embodiments, other mechanisms (e.g., glue) can be used in addition to the folded edge 1302.

For example, glue can be applied between the formed ply 1304 and unformed ply 1306 and/or under the folded edge 1302.

Figure 14A:
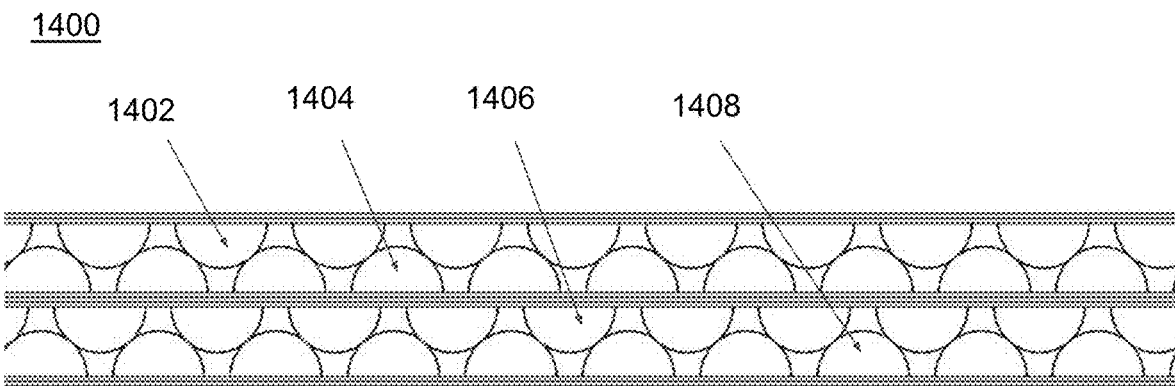
FIGS. 14A and 14B depict layered multiple-ply and single-formed packaging material.
Figure 14B:
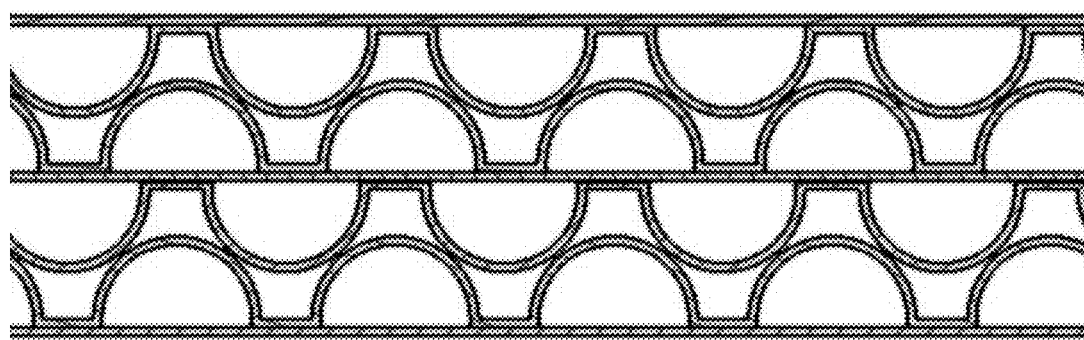

FIGS. 14A and 14B depict multiple-ply and single-formed packaging materials 1400 including a first formed ply 1402, second formed ply 1404, third formed 1406, and forth formed ply 1408. In some embodiments, multiple plies, formed and unformed, can be adhered to any side of a formed or unformed ply. For example, in FIGS. 14A and 14B, first formed ply 1402 and second formed ply 1404 are adhered to each other on the side having the protrusions to form a two-ply material. Additionally, the plies 1402 and 1404 are adhered such that the protrusions alternate, rather than having the apex of the protrusions in contact. In some embodiments, the plies can be adhered such that the apex of protrusions are in contact. Alternatively, the plies can be adhered such that the protrusions extend in opposite directions.

In some embodiments, multiple two-ply materials can be stacked on top of each other. For example, in FIGS. 14A and 14B, plies 1402 and 1404 form one two-ply material and plies 1406 and 1408 form another two-ply material. These two-ply materials are then layered on top of each other to provide more protection and insulation. In some embodiments, an adhesive layer can be used to adhere the plies together. For example, adhesive material can be used between plies 1402 and 1404 and/or between plies 1404 and 1406.

Figure 15A:
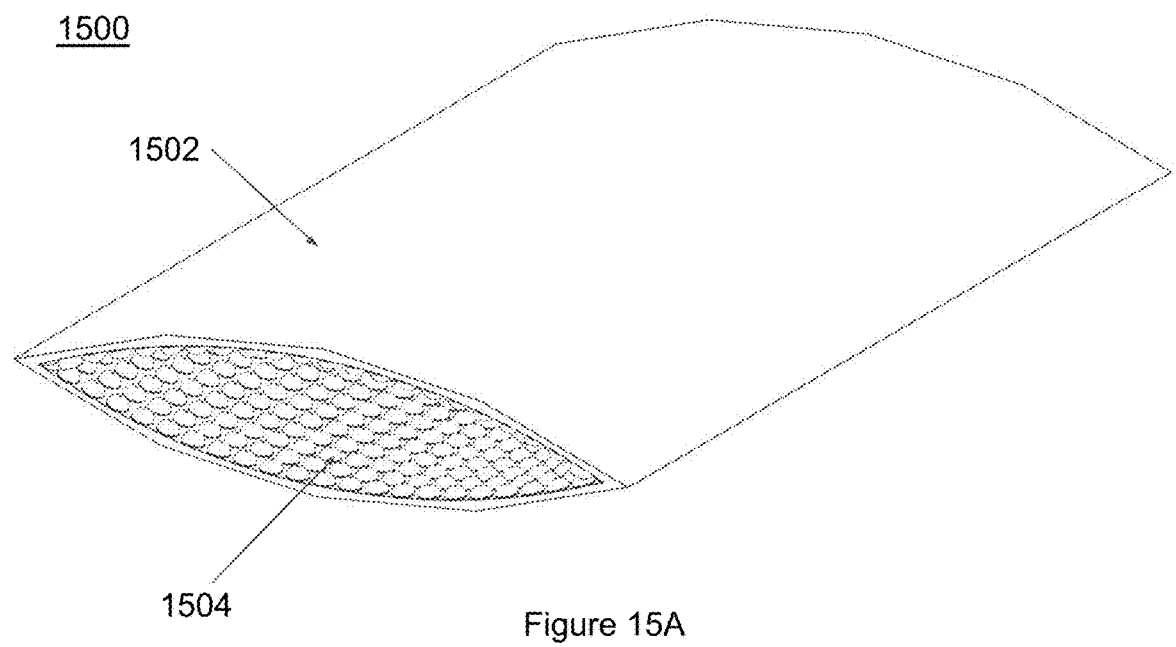
FIGS. 15A and 15B depict an exemplary shipping container having a two-ply and single-formed packaging material.
Figure 15B:
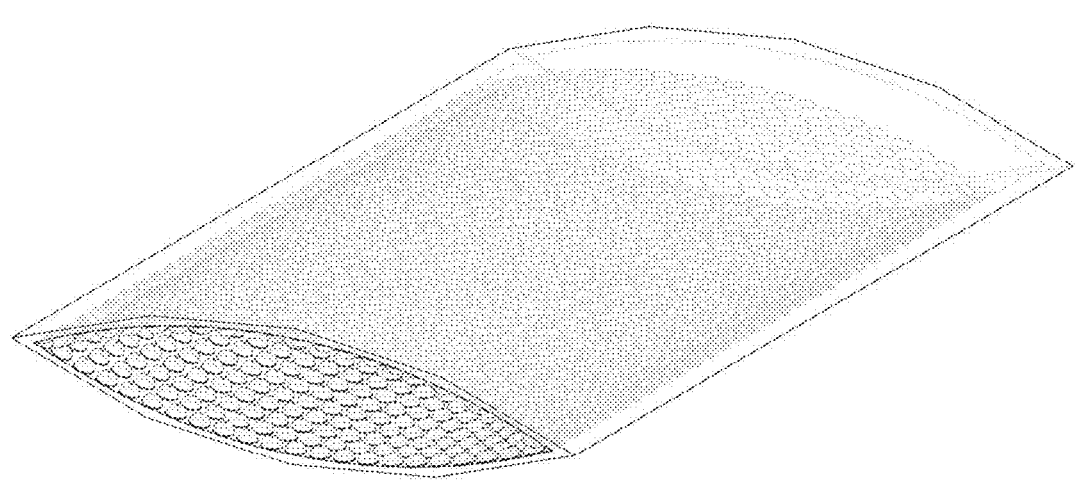

FIGS. 15A and 15B depict an isometric view of an exemplary shipping container 1500 having a two-ply and single-formed material. Shipping container 1500 includes an outer layer 1502 and two-ply material 1504. Outer layer 1502 can be a standard recyclable shipping container exterior such as paper. In some embodiments, the outer layer 1502 can be an unformed ply. Two-ply material 1504 can include a formed ply adhered to an unformed or formed ply. In some embodiments, the protrusions can extend into the shipping container 1500. Alternatively, in some embodiments, the protrusions can extend towards the outer layer 1502. Further, if both plies are formed plies, the protrusions can extend both towards the outer layer 1502 and into shipping container 1500.

Figure 16:
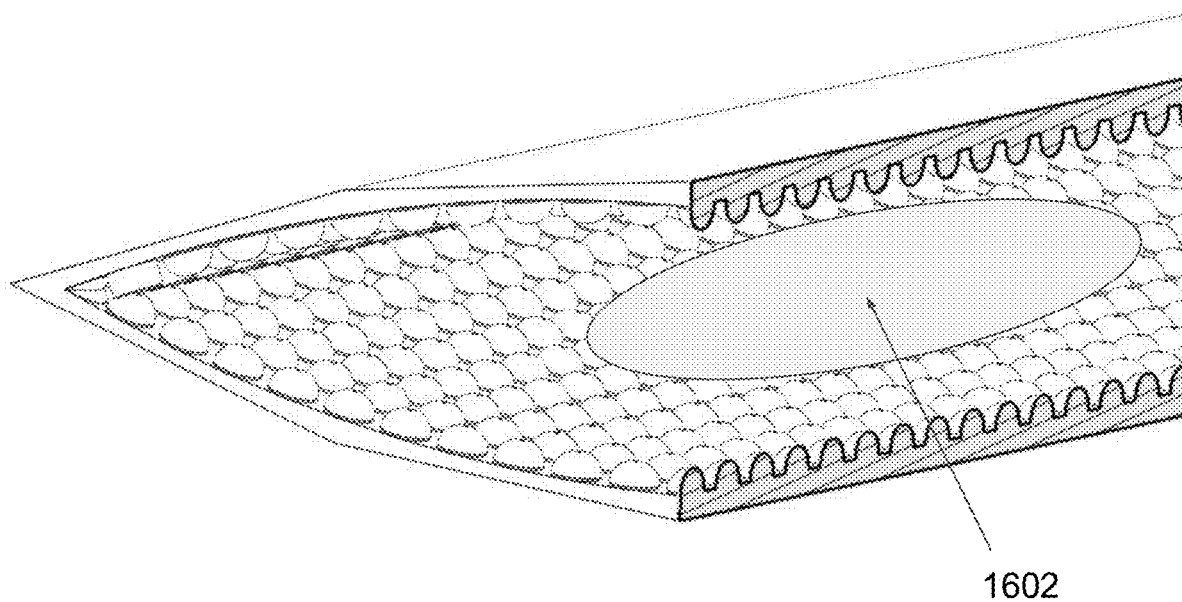
FIG. 16 depicts a cross-sectional view of an exemplary shipping container.

FIG. 16 is a cross-sectional view of an exemplary shipping container 1600 with a space 1602 to place a product. Shipping container 1600 includes features similar to shipping container 1500. In some embodiments, space 1602 is provided for the product such that the packaging material will hold the product in the multiple-ply packaging material. Thus, the shipping container 1600 can provide added protected and insulation. Further, space 1602 may prevent the product from being displaced during transport.

Figure 17A:
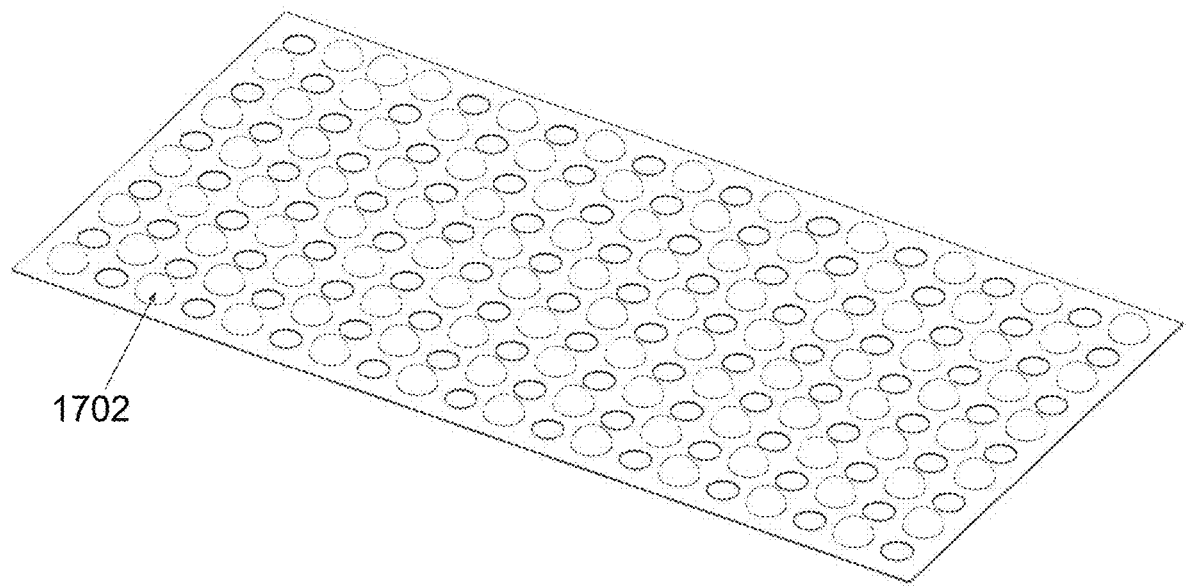
FIGS. 17A and 17B depict a one-ply and single-formed packaging material with alternating protrusions.
Figure 17B:
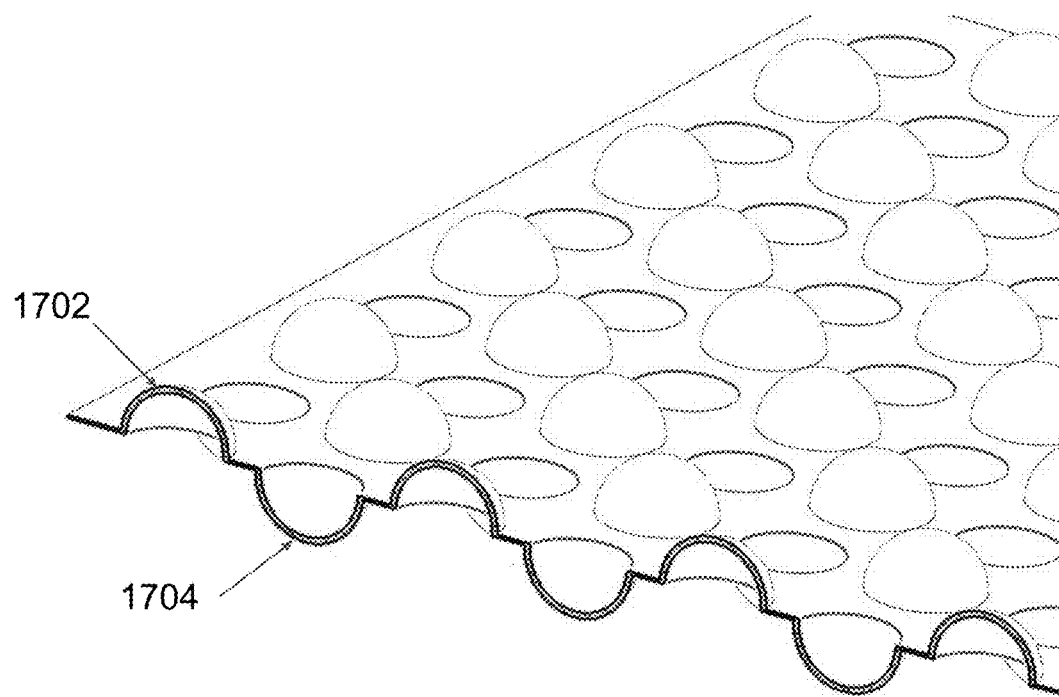
Figure 18:
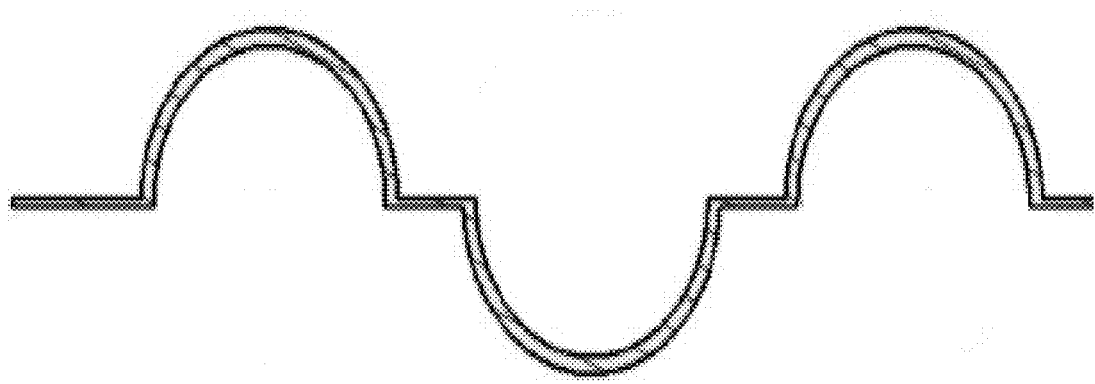
FIG. 18 depicts a cross-sectional one-ply and single-formed packaging material with alternating protrusions.

FIGS. 17A and 17B depict a one-ply and single-formed packaging material 1700 with alternating protrusions. Packaging material 1700 includes top side protrusion 1702 and bottom side protrusion 1704. In some embodiments, protrusions can alternate the direction in which they extend. For example, in FIGS. 17A and 17B, neighboring protrusions do not extend in the same direction. In another example, FIG. 18 depicts a cross-sectional one-ply and single-formed packaging material 1800 with alternating protrusions. In an alternating design, in order to seal the gas pockets, at least two additional plies can be used. For example, a first ply to be adhered to one side of the alternating ply and a second ply for the other side.

Figure 19:
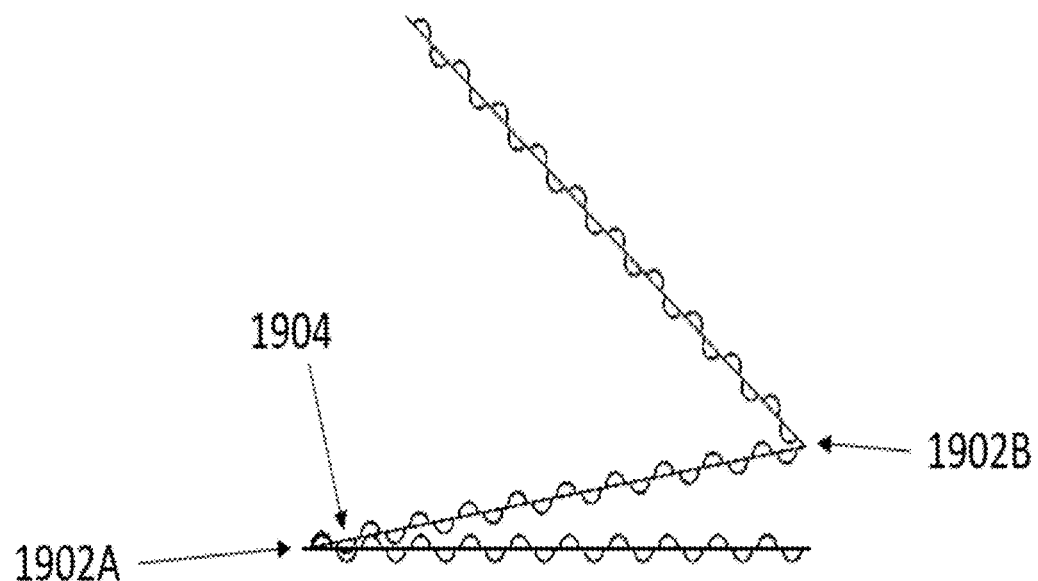
FIG. 19 depicts a nesting feature of an embodiment of the packaging material.

FIG. 19 depicts a nesting feature of an embodiment of the packaging material 1900. Packaging material 1900 includes perforations 1902A and 1902B, and nesting protrusions 1904. Perforations are small holes, or a row of small holes punched into a ply so that a portion of the ply can be removed or folded along the holes. This is useful because packaging material 1900 can be manufactured as one long sheet (e.g. for spooling). The sheets can be perforated to allow for folding or removing of a portion.

In some embodiments, the protrusions in the packaging material 1900 can be designed to nest into each other such that they interlock. For example, the protrusions can alternate in opposite directions along the length and width of the packaging material 1900. Further, the perforations 1902A and 1902B can be made at fixed intervals. By doing so, the protrusions can nest into each other. In other words, a protrusion can nest into a recess. This design allows for a densely packed packaging material that increases protection while reducing the space needed for storage.

FIGS. 20A and 20B are tables illustrating the properties of standard paper and improved paper according to some embodiments. In some embodiments, the packaging material described herein is made of improved paper. As described above, improved paper has elastic properties that allow the paper to be stretched further without rupturing during the protrusion forming process. FIG. 20A provides the statistical differences between standard paper and improved paper in terms of basis weight, tensile strength and elongation at break. Moreover, FIG. 20B depicts the advantages of improved paper in terms of the differences in physical dimensions of the protrusions.

Elongation at break is the ratio between increased length and initial length after breakage of the ply at a controlled temperature. In other words, elongation at break is a measurement of the ability of the ply to resist changes on shape without cracking. Elongation at break is calculated by the following formula, where ΔL is the final length and L is the initial length:

$$\text{Elongation} = \varepsilon = (\Delta L/L) \times 100$$

Tensile strength is the maximum stress that a material can withstand while being stretched or pulled before breaking. Tensile strength is calculated by the following formula, where σ is the tensile stress, F is the acting force, and A is the cross-sectional area.

$$\sigma = F/A$$

In some embodiments, the properties of "improved paper" and the dimensions of the protrusions from an improved paper ply are defined by the exact values set forth in FIGS. 20A and 20B, respectively. In other embodiments, these properties and dimensions are defined by approximately the values set forth in FIGS. 20A and 20B, respectively, where "approximately" in this context means within a 20% tolerance of each stated value. Improved paper that has the above-described properties is available from, for example, Mondi Group, of Addlestone, United Kingdom.

CONCLUSION

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A packaging material comprising:
    a first ply made of paper and having a surface and a plurality of protrusions from the surface that form a corresponding plurality of volumes;
    a second ply adhered to the first ply to seal the plurality of volumes,
    wherein the packaging material is made of paper that has a tensile strength greater than or equal to approximately 8 kN/m in a machine direction and greater than or equal to approximately 6 kN/m in a cross direction,
    wherein the plurality of volumes forms a plurality of gas pockets between the second ply and the first ply, and
    wherein a portion of the second ply extends beyond the first ply in a first direction, and wherein the portion is folded onto the first ply.

2. The packaging material of claim 1, wherein the packaging material is made of paper that has an elongation at break greater than or equal to approximately 9% in the machine direction.

3. The packaging material of claim 1, wherein the packaging material is made of paper that has an elongation at break greater than or equal to approximately 9% in the cross direction.

4. The packaging material of claim 1, wherein the plurality of protrusions are substantially circular in a plane of the first ply.

5. The packaging material of claim 4, wherein a diameter of each of the plurality of protrusions is approximately 10 mm, a depth of each of the plurality of protrusions is approximately 4 mm, and a volume of each of the plurality of protrusions is approximately 314 mm3.

6. The packaging material of claim 1, wherein the first ply includes a first top side, a first bottom side opposite the first top side, wherein the first bottom side includes a first set of flat portions and a first set of recessed portions, and the second ply comprising:
    a second top side and a second bottom side opposite the second top side, wherein the second bottom side comprises a second set of flat portions and a second set of recessed portions, and wherein the second ply is coupled to the first ply such that the first set of flat portions align with the second set of flat portions and the first set of recessed portions align with the second set of recessed portions to form a plurality of expanded gas pockets.

7. The packaging material of claim 6, wherein the plurality of protrusions correspond to the first set of recessed portions.

8. A packaging material comprising:
    a first ply made of paper and having a surface and a plurality of protrusions from the surface that form a corresponding plurality of volumes;
    wherein the packaging material is made of paper that has a tensile strength in a machine direction of approximately 5.5 kN/m and approximately 3.2 kN/m in a cross direction.

9. The packaging material of claim 8, wherein the packaging material is made of paper that has an elongation at break greater than or equal to approximately 2.5% in the machine direction.

10. The packaging material of claim 8, wherein the packaging material is made of paper that has an elongation at break greater than or equal to approximately 4% in the cross direction.

11. The packaging material of claim 8, further comprising:
    a second ply adhered to the first ply to seal the plurality of volumes.

12. The packaging material of claim 11, wherein the plurality of volumes forms a plurality of gas pockets between the second ply and the first ply.

13. The packaging material of claim 11, wherein a portion of the second ply extends beyond the first ply in a first direction, and wherein the portion is folded onto the first ply.

14. The packaging material of claim 8, wherein the plurality of protrusions are substantially circular in a plane of the first ply.

15. The packaging material of claim 14, wherein a diameter of each of the plurality of protrusions is approximately 10 mm, a depth of each of the plurality of protrusions is approximately 4 mm, and a volume of each of the plurality of protrusions is approximately 314 mm3.

16. The packaging material of claim 8, wherein the first ply includes a first top side, a first bottom side opposite the first top side, wherein the first bottom side includes a first set of flat portions and a first set of recessed portions, and wherein a second ply is adhered to the first ply to seal the plurality of volumes, the second ply further comprising:
- a second top side and a second bottom side opposite the second top side, wherein the second bottom side comprises a second set of flat portions and a second set of recessed portions, and wherein the second ply is coupled to the first ply such that the first set of flat portions align with the second set of flat portions and the first set of recessed portions align with the second set of recessed portions to form a plurality of expanded gas pockets.

17. The packaging material of claim 16, wherein the plurality of protrusions correspond to the first set of recessed portions.

\* \* \* \* \*